(12) United States Patent
Moon et al.

(10) Patent No.: US 7,940,770 B2
(45) Date of Patent: May 10, 2011

(54) RECEPTION DEVICE, TRANSMISSION DEVICE, COMMUNICATION SYSTEM AND ASSOCIATED METHODOLOGY FOR DATA TRANSMISSION RE-ESTABLISHMENT THROUGH A LOWER LAYER OF A TRANSMISSION PROTOCOL

(75) Inventors: Sung Uk Moon, Yokohama (JP); Minami Ishii, Yokohama (JP); Takehiro Nakamura, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 761 days.

(21) Appl. No.: 11/722,736

(22) PCT Filed: Dec. 26, 2005

(86) PCT No.: PCT/JP2005/023822
§ 371 (c)(1),
(2), (4) Date: Jan. 23, 2008

(87) PCT Pub. No.: WO2006/068272
PCT Pub. Date: Jun. 29, 2006

(65) Prior Publication Data
US 2008/0225817 A1    Sep. 18, 2008

(30) Foreign Application Priority Data

Dec. 24, 2004 (JP) ............... 2004-374912
Jan. 7, 2005 (JP) ............... 2005-003147

(51) Int. Cl.
*H04L 12/28* (2006.01)
*H04J 3/17* (2006.01)
*H04B 1/38* (2006.01)

(52) U.S. Cl. ............ 370/394; 370/433; 375/222

(58) Field of Classification Search .............. None
See application file for complete search history.

(56) References Cited

U.S. PATENT DOCUMENTS

| 5,537,404 | A | * | 7/1996 | Bentley et al. | 370/384 |
| 5,751,719 | A | * | 5/1998 | Chen et al. | 370/473 |
| 7,881,204 | B2 | * | 2/2011 | Torsner | 370/236 |

FOREIGN PATENT DOCUMENTS

| EP | 1 478 137 A1 | 11/2004 |
| JP | 11-177536 | 7/1999 |

OTHER PUBLICATIONS

3GPP TS 25.322 V6 2.0, HTTP://WWW.3GPP.ORG/FTP/SPECS/ARCHIVE/25_SERIES/25.322/25322-620.ZIP, Dec. 23, 2004, pp. 15 to 17, 23, 53 to 56, and 61 to 63.

(Continued)

*Primary Examiner* — Nittaya Juntima
(74) *Attorney, Agent, or Firm* — Oblon, Spivak, McCellland, Maier & Neustadt, L.L.P.

(57) ABSTRACT

An acquiring unit (60) of a reception device acquires, from a transmission device, a notification of re-establishment of data in a lower layer. A notifying/instructing unit (70) of the reception device notifies, to the transmission device, a sequence number in a higher layer of data which is desired to be received. An RLC processing unit (40) of the transmission device acquires, from the reception device, a sequence number in a higher layer of data which is desired to be received; and performs the re-establishment from the data having the sequence number.

7 Claims, 5 Drawing Sheets

OTHER PUBLICATIONS

Erricsson, "RLC PDU size change improvements", 3GPP TSG-RAN WG2 meeting #42, R2-041062, May 2004, URL, http://www.3gpp.org/ftp/tsg_ran/WG2_RL2/TSGR2_42/Docs/R2-041062.zip, 3 pages.

Office Action issued Sep. 28, 2010, in Japan Patent Application No. 2005-003147 (with English-language Translation).

Office Action issued Feb. 8, 2011, in Japanese Patent Application No. 2005-003147, with English translation. (4 pages).

* cited by examiner

RECEPTION DEVICE, TRANSMISSION DEVICE, COMMUNICATION SYSTEM AND ASSOCIATED METHODOLOGY FOR DATA TRANSMISSION RE-ESTABLISHMENT THROUGH A LOWER LAYER OF A TRANSMISSION PROTOCOL

TECHNICAL FIELD

The present invention relates to a reception device, a transmission device, a communication system and a communication method.

BACKGROUND ART

In the Wideband Code Division Multiple Access (W-CDMA) being one of the radio access systems, a communication between a mobile station (UE: User Equipment) and a radio access network (UTRAN: Universal Terrestrial Radio Access Network) is performed according to the Radio Link Control (RLC) protocol.

Further, in some cases, a re-establishment of data is made in the RLC layer following the RLC protocol (for example, refer to the Non-patent Document 1).

[Non-patent Document 1] 3GPP TSG-RAN, "TS25.322 V6.1.0 Radio Link Control (RLC) protocol specification", September, 2004.

However, when data has been re-established, in some cases, a reception device sometimes discards data before completely receiving the whole data, or, a transmission device sometimes discards data before receiving an acknowledgement of receipt of the whole data. In this way, there has been a problem that a data loss occurs.

DISCLOSURE OF THE INVENTION

Hence, the present invention has been made in light of the above-described problem, and an object thereof is to prevent a data loss from occurring due to re-establishment of data.

A first aspect of the present invention is summarized as a reception device including: an acquiring unit configured to acquire, from a transmission device, a notification of re-establishment of data in a lower layer; a notifying unit configured to notify, to the transmission device, a sequence number in a higher layer of data which is desired to be received; and a lower layer processing unit configured to perform a reception process of data which is re-established from the data having the sequence number.

In the first aspect of the present invention, the notifying unit can be configured to notify the sequence number in the higher layer, based on the reception result of the data.

In the first aspect of the present invention, the acquiring unit can be configured to acquire, from the transmission device, instruction data for requesting the sequence number; and the notifying unit can be configured to notify the sequence number, in accordance with the instruction data.

A second aspect of the present invention is summarized as a transmission device including: a notifying unit configured to notify, to a reception device, re-establishment of data in a lower layer; an acquiring unit configured to acquire, from the reception device, a sequence number in a higher layer of data which is desired to be received; and a lower layer processing unit configured to perform the re-establishment from the data having the sequence number.

In the second aspect of the present invention, the lower layer processing unit can be configured to perform the re-establishment from the data having the sequence number, when changing a size of data unit in the lower layer.

In the second aspect of the present invention, the transmission device can further include: a judging unit configured to judge necessity of the re-establishment; wherein the lower layer processing unit can be configured to perform the re-establishment from the data having the sequence number, when the judging unit judges that the re-establishment is necessary.

In the second aspect of the present invention, the transmission device can further include: a instructing unit configured to request the reception device to notify the sequence number, by transmitting instruction data.

A third aspect of the present invention is summarized as a communication system including: a reception device configured to acquire, from a transmission device, a notification of re-establishment of data in a lower layer; to notify, to the transmission device, a sequence number in a higher layer of data which is desired to be received; and to perform a reception process of data which is re-established from the data having the sequence number; and a transmission device configured to notify, to the reception device, the re-establishment; to acquire, from the reception device, a sequence number in a higher layer of data which is desired to be received; and to perform the re-establishment from the data having the sequence number.

A fourth aspect of the present invention is summarized as a communication method including: notifying, from a transmission device to a reception device, re-establishment of data in a lower layer; notifying, from the reception device to the transmission device, a sequence number in a higher layer of data which is desired to be received; performing, at the transmission device, the re-establishment from the data having the sequence number; and performing, at the reception device, a reception process of data which is re-established from the data having the sequence number.

BEST MODES FOR CARRYING OUT THE INVENTION (Communication System)

Figure 1:
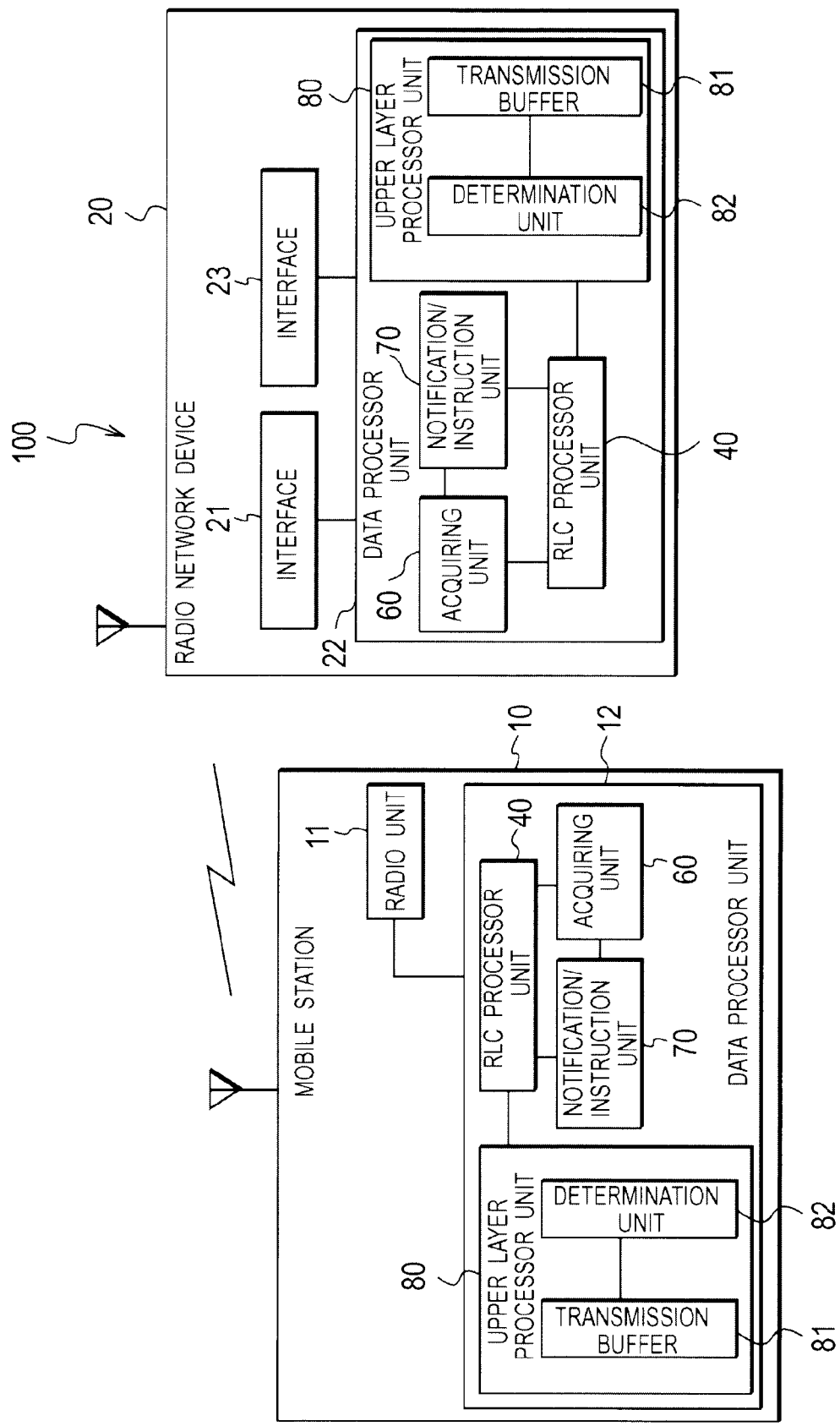
FIG. 1 is a block diagram showing a configuration of a communication system according to an embodiment of the present invention.

As shown in FIG. 1, a communication system 100 includes a mobile station 10 and a radio network device 20.

When data are transmitted from the radio network device 20 to the mobile station 10, the mobile station 10 operates as a reception device, and the radio network device 20 operates as a transmission device.

On the other hand, when data are transmitted from the mobile station 10 to the radio network device 20, the mobile station 10 operates as a transmission device, and the radio network device 20 operates as a reception device.

In the communication system 100, the W-CDMA is used as a radio access method.

Figure 2:
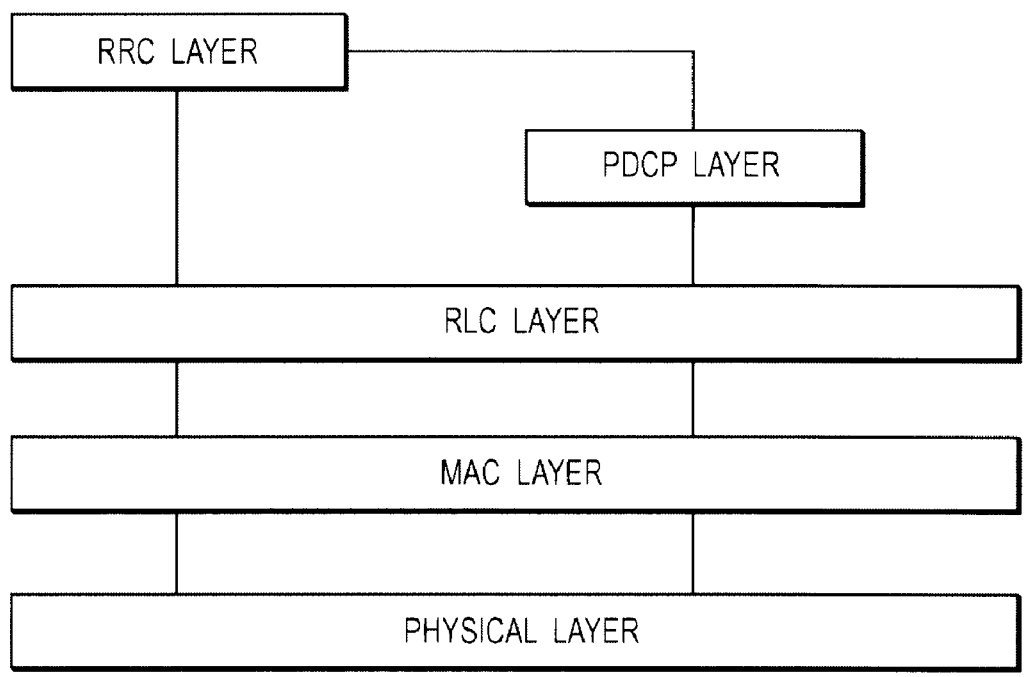
FIG. 2 is a diagram showing a layer configuration of the communication system according to the embodiment of the present invention.

A layer configuration of the communication system 100 is shown in FIG. 2. A lowermost layer is a physical layer, and an uppermost layer is a Radio Resource Control (RRC). In the configuration of the communication system 100, a physical layer, a Medium Access Control (MAC) layer, a Radio Link Control (RLC) layer, and a Packet Data Convergence Protocol (PDCP) layer are arranged in ascending order.

Data to which an overhead such as a header of its own layer is added are provided from an upper layer to a lower layer.

Data from which an overhead such as a header of its own layer is deleted are provided from a lower layer to an upper layer.

A header contains control information such as sequence numbers.

Next, the mobile station 10 and the radio network device 20 are described in further detail. As shown in FIG. 1, the mobile station 10 includes a radio unit 11 and a data processor unit 12. The radio network device 20 includes an interface 21, a data processor unit 22, and an interface 23.

The radio unit 11 makes the transmission and reception of data by radio with the radio network device 20.

The interface 21 makes the transmission and reception of data with the mobile station 10.

The interface 23 is an interface with a network, and receives data to the mobile station 10 and transmits data from the mobile station 10.

The data processor units 12, 22 perform various processes on data.

The data processor unit 12 acquires data received from the radio network unit 20 through the radio unit 11, and processes the data thus received. The data processor unit 12 processes data to be transmitted to the radio network unit 20, and provides the radio unit 11 with the data thus processed.

The data processor unit 22 acquires data received from the mobile station 10 through the interface 21, processes the data thus received, and provides the interface 23 with the data thus processed. The data processor unit 22 acquires data to be transmitted from the interface 23 to the mobile station 10, processes the data, and provides the interface 21 with the data.

The data processor units 12 and 22 each include an RLC processor unit 40, an acquiring unit 60, an notification/instruction unit 70, and an upper layer processor unit 80.

As described above, since the mobile station 10 and the radio network device 20 each operate as a reception device and a transmission device, the data processor units 12 and 22 each include functions as a reception device and a transmission device.

The upper layer processor unit 80 performs a data process in an upper layer according to a protocol in a higher layer than the RLC protocol.

For example, the upper layer processor unit 80 performs data processes in the RRC layer and the PDCP layer according to protocols for the RRC layer and the PDCP layer.

The upper layer processor unit 80 includes a transmission buffer 81 and a determination unit 82.

The transmission buffer 81 stores therein data to be transmitted to the party on the other end of communication.

The determination unit 82 determines whether or not a re-establishment of data in a lower layer is necessary. The determination unit 82 determines whether or not the re-establishment of data, in the RLC layer being a layer lower than the RRC layer and the PDCP layer, is necessary.

For example, the determination unit 82 detects an amount of data stored in the transmission buffer 81, and is capable of determining whether or not the re-establishment of data is necessary, on the basis of the detected amount of data.

To be more precise, when an amount of data to be transmitted is increased, the determination unit 82 determines that the size of the data unit in the RLC layer, i.e. an RLC-Protocol Data Unit (PDU), needs to be changed and, therefore, can determine that the re-establishment is necessary.

For example, the determination unit 82 can hold a correspondence relationship between the size of the data unit (RLC-PDU) and an amount of data.

Further, the determination unit 82 compares an amount of data acquired from the transmission buffer 81 with the correspondence relationship, and can determine a data unit (RLC-PDU), which is suitable for the amount of data.

When the current data unit (RLC-PDU) and the data unit (RLC-PDU) thus determined are different from each other, the determination unit 82 can determine that the size of the data unit (RLC-PDU) is changed and the re-establishment is necessary.

The determination unit 82 instructs the RLC processor unit 40 on the basis of a determined result. For example, the determination unit 82 can request the RLC processor unit 40 to change the size of the data unit (RLC-PDU) and re-establish data, on the basis of a determined result.

In this manner, re-establishment is requested from the PRC layer or the PDCP layer being an upper layer to the RLC layer being a lower layer.

Further, the determination unit 82 can determine whether or not the re-establishment is necessary, on the basis of a status of channel switching, a status of a state transition and the like, besides an amount of data to be transmitted.

To be more precise, the determination unit 82 can determines that the re-establishment is necessary when switching a channel, for example, switching from a dedicated channel to a common channel.

Further, the determination unit 82 can determine that the re-establishment is necessary at a time of a state transition, for example, at a time of a transition from a CELL_FACH state to a CELL_DCH state.

The RLC processor unit 40 performs a data process in the RLC layer according to the RLC protocol. The RLC processor unit 40 sets an RLC connection, and provides an upper layer with data transmission services of three kinds of modes.

To be more precise, for a data transfer, there are three kinds of modes, which are a transparent mode (TM), an unacknowledged mode (UM) and an acknowledged mode (AM).

Further, the RLC processor unit 40 performs processes such as segmentation and reassembly of data, concatenation of data, padding, transfer of use data, error correction, in-sequence delivery of upper layer PDUs, duplicate detection, flow control, protocol error detection and recovery, ciphering, and discard of data.

The RLC processor unit 40 is described in detail with reference to FIG. 3.

Figure 3:
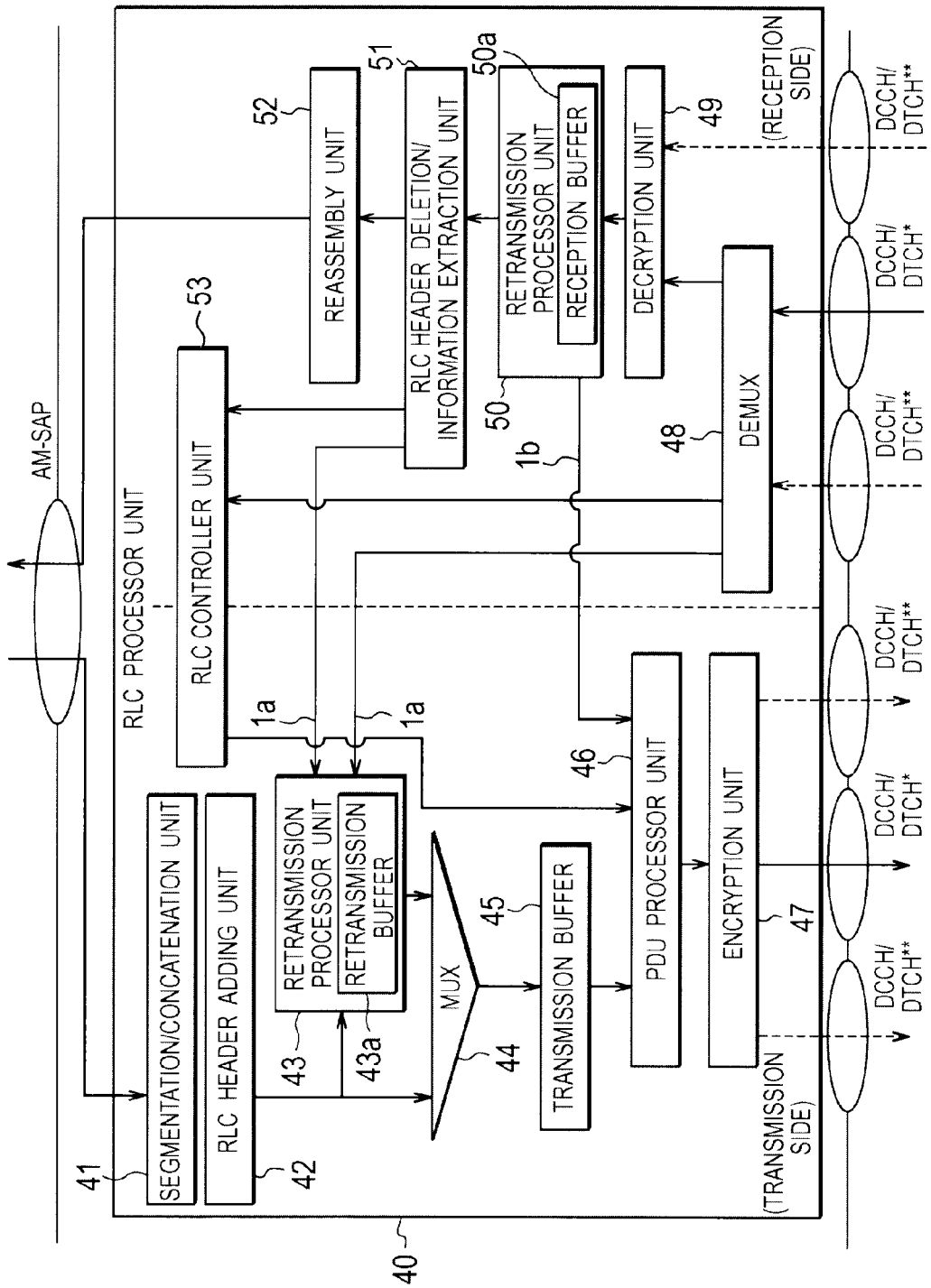
FIG. 3 is a block diagram showing a configuration of an RLC processor unit according to the embodiment of the present invention.

In FIG. 3, in the case of the acknowledged mode (AM), a description is given referring to a function being an AM-RLC entity as an example. In FIG. 3, the left side indicates a function when operating as a transmission device (transmitting side), while the right side indicates a function when operating as a reception device (receiving side).

The RLC processor unit 40 includes a segmentation/concatenation unit 41, an RLC header adding unit 42, a retransmission processor unit 43, a MUX 44, a transmission buffer 45, a PDU processor unit 46, an encryption unit 47, a DEMUX 48, a decryption unit 49, a retransmission processor unit 50, an RLC header deletion/information extraction unit 51, a reassembly unit 52, and an RLC controller unit 53.

First, a transmission function is described.

The segmentation/concatenation unit 41 acquires data (RLC-SDU: Service Data Unit) from an upper layer than the RLC.

To acquire fixed-length data (PDU), the segmentation/concatenation unit 41 segments or concatenates the RLC-SDU thus acquired.

For example, in order to acquire a fixed-length AMD-PDU (Acknowledged mode data Packet data unit), the segmentation/concatenation unit 41 segments or concatenates the RLC-SDU.

For example, when the size of the acquired RLC-SDU is larger than that of the AMD-PDU, the segmentation/concatenation unit 41 segments the RLC-SDU.

In this way, the AMD-PDU can contain the segmented or concatenated RLC-SDU.

The size of a data unit such as an Uplink AMD-PDU is a semi-static value specified by an upper layer than the RLC.

The size of a data unit such as the Uplink AMD-PDU is changed in response to a request on re-establishment of data made from the upper layer processor unit 80 to the RLC processor unit 40, that is, in response to a request or the like on re-establishment of data made from an upper layer such as the RRC layer or the PDCP layer to a lower layer such as the RLC layer.

Further, the segmentation/concatenation unit 41 sets a length indicator. The length indicator can be used to determine a boundary of the RLC-SDU between the AMD-PDUs. Further, the length indicator can also be used to determine whether or not padding, or the Piggybacked STATUS PDU containing control information referred to as the Piggybacked Information are contained in the AMD-PDU.

The segmentation/concatenation unit 41 inputs a generated AMD-PDU in the RLC header adding unit 42.

The RLC header adding unit 42 adds an RLC header to the acquired AMD-PDU. The RLC header adding unit 42 inputs the AMD-PDU, to which the RLC header has been added, into the retransmission processor unit 43 and the MUX 44.

The retransmission processor unit 43 performs a retransmission management to retransmit data to a device at the other end of the communication.

The retransmission processor unit 43 includes a retransmission buffer 43a in which a PUD to be retransmitted is stored. The retransmission processor unit 43 stores an acquired AMD-PDU in the retransmission buffer 43a.

The retransmission processor unit 43 deletes an AMD-PDU in the retransmission buffer 43a or inputs an AMD-PDU into the MUX 44 for the purpose of retransmission according to control information to be transmitted by the RLC processor unit 40 (AM-RLC entity) of the device at the other end of the communication.

For example, the retransmission processor unit 43 acquires a STATUS PDU and a Piggybacked STATUS PDU from the device at the other end of the communication, and deletes or retransmits a PDU in the retransmission buffer 43a according to a status report contained in the STATUS PDU and the Piggybacked STATUS PDU thus acquired.

The status report contains a received result 1a for each AMD-PDU from the RLC processor unit 40 (AM-RLC entity).

The received result 1a contains a positive acknowledgement indicating that the reception of data is normal, and a negative acknowledgement indicating that the reception of data is failed.

The MUX 44 multiplexes AMD-PDUs. The MUX 44 multiplexes a new AMD-PDU acquired from the RLC header adding unit 42, and an AMD-PDU acquired from the retransmission processor unit 43 and needed to be retransmitted. The MUX 44 stores a PDU acquired through the multiplexing in the transmission buffer 45.

The PDU processor unit 46 performs a process on a PDU. The PDU processor unit 46 acquires PDUs from the transmission buffer 45 and the RLC controller unit 53.

The PDU processor unit 46 adds a PDU header to the PDU thus acquired. For example, the PDU processor unit 46 can acquire a polling bit of control information from the RLC controller unit 53, generate an AMD-PDU header, and add the same to an AMD-PDU.

Further, in order to generate a PDU having a targeted size, e.g., a fixed-length AMD-PDU, the PDU processor unit 46 can perform padding or set a Piggybacked STATUS PDU.

The PDU processor unit 46 can change the size of the Piggybacked STATUS PDU, so as to fit it to a free space for the AMD-PDU.

Further, the PDU processor unit 46 generates a STATUS PDU and a Piggybacked STATUS PDU containing, as status reports, received results 1b (Acknowledgement) of data transmitted from the device at the other end of the communication, and requests the RLC processor unit 40 of the device at the other end of the communication to retransmit.

The PDU processor unit 46 inputs a PDU in the encryption unit 47.

The encryption unit 47 encrypts a PDU. The encryption unit 47 encrypts an AMD-PDU, but does not encrypt an AMD-PDU header. However, the encryption unit 47 encrypts the Piggybacked STATUS PDU and the padding.

Further, the encryption unit 47 does not encrypt control PDUS such as a STATUS PDU, a RESET PDU and a RESET ACK PDU. The encryption unit 47 provides a control PDU and an AMD-PDU after being encrypted, to a lower layer than the RLC layer. Data are transmitted by a DCCH/DTCH (Dedicated Control Channel/Dedicated Traffic Channel).

Next, a receiving function is described.

The DEMUX 48 acquires an AMD-PDU and a control PDU received from the lower layer than the RLC layer by the DCCH/DTCH.

The decryption unit 49 acquires an AMD-PDU from the lower layer or the DEMUX 48.

The DEMUX 48 separates a multiplexed AMD-PDU, and inputs the separated AMD-PDU into the decryption unit 49.

Incidentally, the size of a data unit such as a Downlink AMD-PDU is a semi-static value specified by an upper layer than the RLC layer.

The size of the data unit such as a Downlink AMD-PDU is changed in response to a request on re-establishment of data made from the upper layer processor unit 80, that is, in response to a request on re-establishment of data made from an upper layer such as the RRC layer or the PDCP layer to a lower layer such as the RLC layer.

When not specified, the size of the Downlink AMD-PDU can be determined on the basis of the size of a firstly received PDU.

In addition, the size of the Downlink AMD-PDU and the size of the Uplink AMD-PDU are not necessarily the same.

Further, the DEMUX 48 routes control PDUs such as a RESET PDU and a RESET ACK PDU to the RLC controller unit 53.

The DEMUX 48 routes, to the retransmission processor unit 43, a STATUS PDU acquired from the RLC processor unit 40 (AM-RLC entity) of the device at the other end of the communication.

The STATUS PDU contains the received result 1a of the device at the other end of the communication, that is, the positive acknowledgement and/or the negative acknowledgement.

In this manner, the DEMUX 48 routes a received acknowledgement received from the device at the other end of the communication to the retransmission processor unit 43.

The decryption unit 49 decrypts an acquired AMD-PDU. The decryption unit 49 inputs a PDU after being decrypted into the retransmission processor unit 50.

The retransmission processor unit 50 performs retransmission management so as to request a retransmission of data to the device at the other end of the communication.

The retransmission processor unit 50 includes a reception buffer 50a in which a received PDU is stored. Until receiving a complete RLC-SDU, the retransmission processor unit 50 stores an acquired AMD-PDU in the reception buffer 50a.

In terms of an AMD-PDU which has been normally received, the retransmission processor unit 50 generates a positive acknowledgement, and routes the generated positive acknowledgement to the PDU processor unit 46.

On the other hand, in terms of an AMD-PDU which has not been normally received, the retransmission processor unit 50 generates a negative acknowledgement, and routes the generated negative acknowledgement to the PDU processor unit 46.

In this way, the retransmission processor unit 50 routes its own received result 1b to the PDU processor unit 46. Thus, the PDU processor unit 46 can generate a STATUS PDU and a Piggybacked STATUS PDU containing the own received result 1b (acknowledgement) as a status report, transmit the same to the RLC processor unit 40 (AM-RLC entity) of the device at the other end of the communication, and request to retransmit.

Upon completely receiving the RLC-SDU, the retransmission processor unit 50 inputs an AMD-PDU stored in the reception buffer 50a into the RLC header deletion/information extraction unit 51.

The RLC header deletion/information extraction unit 51 deletes an RLC header from the acquired AMD-PDU. The RLC header deletion/information extraction unit 51 inputs, into the reassembly unit 52, the AMD-PDU from which the RLC header has been deleted.

Further, when the Piggybacked STATUS PDU has been set, the RLC header deletion/information extraction unit 51 extracts control information (Piggybacked Information).

The RLC header deletion/information extraction unit 51 routes the extracted control information (Piggybacked Information) to the retransmission processor unit 43 and the RLC controller unit 53.

The control information (Piggybacked Information) is capable of containing the received result 1a of the device at the other end of the communication.

Consequently, the RLC header deletion/information extraction unit 51 routes the control information (Piggybacked Information) containing the received result 1a to the retransmission processor unit 43. The RLC header deletion/information extraction unit 51 can thus deletes an AMD-PDU which has been normally received by the device at the other end of the communication, from the transmission buffer 43a, and instructs the retransmission processor unit 43 to retransmit an AMD-PDU which needs to be retransmitted to the device at the other end of the communication.

The reassembly unit 52 assembles an AMD-PDU, reassembles an RLC-SDU, and routes it to an upper layer than the RLC layer. The reassembly unit 52 can acquire an AMD-PDU, only when completely receiving the RLC-SDU.

The RLC controller unit 53 generates a control PDU to respond to the RLC processor unit 40 (AM-RLC entity) of the device at the other end of the communication, on the basis of an acquired control PDU and the like, and inputs the generated control PDU into the PDU processor unit 46.

In addition, the PDU processor unit 46 inputs a polling bit on control information into the RLC controller unit 53.

Subsequently, the discard of an RLC-SDU and the re-establishment of data, which are performed by the RLC processor unit 40, are described in detail.

When a transmission of an RLC-PDU has not been normally completed within a predetermined period of time or within a predetermined number of transmissions, the RLC processor unit 40 discards the RLC-PDU stored in the retransmission buffer 43a. In this way, the retransmission buffer 43a can be prevented from overflowing.

Re-establishment of data in an RLC layer is requested by an upper layer, e.g. the RRC layer and the PDCP layer, than the RLC layer.

To be more precise, the determination unit 82 in the upper layer processor unit 80 determines whether or not a re-establishment of data is necessary. Further, when it is determined that the re-establishment is necessary, re-establishment of data is requested to the RLC processor unit 40.

When the RLC processor unit 40 is requested to re-establish the data, re-establishments of data are performed in data transfers of unacknowledged mode (UM) and of acknowledged mode (AM).

Thus, when the determination unit 82 determines that a re-establishment of data is necessary, the RLC layer processor unit 40 is capable of performing the re-establishment.

According to the above description, since a transmission device is capable of performing re-establishment when needed, a reduction in a control load can be achieved so that a more flexible control can be made possible.

In the case of the unacknowledged mode (UM), re-establishment is performed by the RLC processor units 40 of both the reception device and the transmission device.

The RLC processor unit 40 of the reception device discards all unacknowledged mode data Packet data units (UMD-PDUs), and then starts re-establishment.

The RLC processor unit 40 of the transmission device discards an RLC-SDU which has routed a PDU, even in a small amount, to a lower layer, and then starts re-establishment.

Further, the RLC processor unit 40 of the transmission device notifies an upper layer of a discarded RLC-SDU when requested from the upper layer.

In the case of the acknowledged mode (AM), re-establishment can be performed by at least one of the RLC processor units 40 of the reception device and the transmission device.

When re-establishment is performed only by the RLC processor unit 40 of the reception, the RLC processor unit 40 of the reception discards all AMD-PDUs, and then starts re-establishment.

Further, the RLC processor unit 40 of the transmission discards control PDUs, and then starts re-establishment.

When re-establishment is performed only by the RLC processor unit 40 of the transmission device, the RLC processor unit 40 of the transmission device discards control PDUs and all of RLC-SDU which has transmitted all AMD-PDUs, and then starts re-establishment.

Further, the RLC processor unit 40 of the transmission device newly segments or concatenates RLC-SDUs, not having been discarded, into AMD-PDUs having a size specified by an upper layer.

Incidentally, the size specified at this time may be the same as or different from the size which has been used before performing re-establishment.

When re-establishment is performed by the RLC processor units 40 of both the reception device and the transmission device, the RLC processor unit 40 of the transmission device discards control PDUs and all AMD-PDUs, and then starts re-establishment.

Next, processes of the data processor units 12 and 22, when performing re-establishment, are described in detail. Description is given below by assuming that the RLC layer is a lower layer while the RRC layer, the PDCP layer and the like are upper layers than the RLC layer.

The determination unit 82 of the upper layer processor unit 80 of the transmission device determines whether or not a re-establishment of data in the RLC layer is necessary.

For example, when an amount of data to be transmitted is increased, the determination unit 82 determines that the size of the data unit in the RLC layer, i.e. an RLC-Protocol Data Unit (PDU), needs to be changed and, therefore, determines that the re-establishment is necessary.

Further, the determination unit 82 requests the RLC processor unit 40 to change the size of the data unit (RLC-PDU) and to re-establish data on the basis of a determined result.

Further, the determination unit 82 can also request the RLC processor unit 40 to re-establish data at a time of channel switching, a state transition or the like.

As described above, when receiving a request for the re-establishment from the upper layer processor unit 80, the RLC processor unit 40 of the transmission device notifies the notification/instruction unit 70 of the reception of the request.

Once receiving notification of the re-establishment from the RLC processor unit 40, the notification/instruction unit 70 notifies the reception device of the re-establishment of data in the RLC layer lower than the RRC layer and the PDCP layer.

In this manner, the notification/instruction unit 70 changes the size of a data unit (RLC-PDU) in the RLC layer being a lower layer, so that the notification/instruction unit 70 is capable of notifying the re-establishment when it becomes necessary to perform the re-establishment.

Further, when it becomes necessary to perform a re-establishment due to the changing of a channel, a state transition or the like, the notification/instruction unit 70 is capable of notifying the re-establishment.

For example, the notification/instruction unit 70 of the transmission device generates control information notifying the re-establishment, and transmits the generated control information to the reception device. In this manner, the notification/instruction unit 70 functions as a notifying unit configured to notify the reception device of the re-establishment of data in the lower layer.

Thereafter, the acquiring unit 60 acquires, from the transmission device, the notification of the re-establishment of data in the RLC layer being a lower layer.

The acquiring unit 60 of the reception device inputs the notification of the re-establishment thus acquired into the RLC processor unit 40 and the notification/instruction unit 70.

In response to the notification of the re-establishment acquired from the transmission device, the notification/instruction unit 70 of the reception device notifies the transmission device of sequence numbers in the upper layer for data which the notification/instruction unit 70 desires to receive.

For example, the notification/instruction unit 70 of the reception device acquires a received result of data from the RLC processor unit 40.

Further, on the basis of the received result, the notification/instruction unit 70 of the reception device can notify the transmission device of sequence numbers (RRC sequence numbers and PDCP sequence numbers) in the RRC layer and the PDCP layer being upper layers.

For example, the notification/instruction unit 70 of the reception device can notify the transmission device of sequence numbers of data which has not been completely received normally and which has resulted in a reception error.

In this manner, it is preferable that the notification/instruction unit 70 notifies the transmission device of sequence numbers in the upper layer on the basis of the received data of data.

According to the above description, even in the case where a re-establishment of data is performed, the reception device requests a transmission of data which has not been normally transmitted or received, so that it can receive the data. Hence, the occurrence of a data loss can be more securely prevented.

As described above, the notification/instruction unit 70 functions as a notifying unit configured to notify the transmission device of sequence numbers in an upper layer of data which is desired to be received.

Thereafter, the acquiring unit 60 of the transmission device acquires the sequence numbers in the upper layer of the data which is desired to be received. The acquiring unit 60 of the transmission device notifies the acquired sequence numbers, to the RLC processor unit 40 of the transmission device.

The RLC processor unit 40 of the transmission device performs re-establishment from data having the sequence numbers notified from the reception device.

In this manner, the RLC processor unit 40 of the transmission device functions as a lower layer processor unit configured to perform the re-establishment from data having the sequence numbers that the reception device desires to receive.

It is preferable that, when changing the size of a data unit (RLC-PDU) in the RLC layer being a lower layer, the RLC processor unit 40 perform the re-establishment from data having the sequence numbers of an upper layer.

According to the above description, when it becomes necessary to perform a re-establishment due to the change of the size of a data unit, the transmission device can perform a re-establishment from data having the sequence number in the upper layer notified from the reception device.

For example, when changing a size of a RLC-PDU from 320 bits to 640 bits, the RLC processor unit 40 can perform a re-establishment.

Further, when switching a channel, being at a state transition or the like, the RLC processor unit 40 may perform a re-establishment from data having the sequence number in the upper layer.

When the determination unit 82 determines that a re-establishment is necessary, the RLC processor unit 40 can re-establish from data having the sequence number.

For example, when requested from the upper layer processor unit 80 to change the size of a data unit, i.e. a RLC-PDU, and to perform a re-establishment, the RLC processor unit 40 can perform the re-establishment.

Thereafter, the RLC processor unit 40 of the reception device performs a reception process on the data which is re-established from data having the sequence number notified to the transmission device.

To be more precise, the RLC processor unit 40 performs a segmentation process, a reassembly process and the like on the received data according to the size of a data unit (RLC-PDU) after being re-established.

In this manner, the RLC processor unit 40 works as a lower layer processor unit configured to perform a reception process on the data which is re-established from data having the notified sequence number.

As described above, the reception device may notify the sequence number in response to the notification of a re-establishment, and, however, when notifying the reception device of the re-establishment, the notification/instruction unit 70 of the transmission device may transmit instruction data and request the reception device for the sequence number.

In this case, the acquiring unit 60 of the reception device acquires the instruction data for requesting a sequence number from the transmission device, and inputs the acquired instruction data into the notification/instruction unit 70.

Consequently, the notification/instruction unit 70 can notify the sequence number in response to the instruction data.

To be more precise, an Indicator can be used as the instruction data. When the Indicator is "ON", it designates that the notification of a sequence number is requested, and when the Indicator is "OFF", it designates that the notification of a sequence number is not requested.

As described above, it suffices for the Indicator to be able to be distinguished "ON" and "OFF", for example, it is good enough to add the Indicator of one bit to control data for notifying a re-establishment.

In this manner, the notification/instruction unit 70 transmits instruction data (Indicator) for requesting a sequence number in an upper layer, so that the notification/instruction unit 70 can also work as an instruction unit for requesting the reception device for a sequence number.

The notification/instruction unit 70 of the reception device determines whether or not an Indicator inputted through the acquiring unit 60 is "ON" or "OFF".

When the Indicator is "ON", the notification/instruction unit 70 determines that the notification of a sequence number is necessary, and notifies the sequence number.

On the other hand, when the Indicator is "OFF", the notification/instruction unit 70 determines that the notification of a sequence number is not necessary, and does not notify the sequence number.

Further, the notification/instruction unit 70 can add an Indicator only when a re-establishment is necessary.

In this case, the notification/instruction unit 70 can determine whether or not a sequence number is necessary on the basis of whether an Indicator is present or not.

To be more precise, when an Indicator is added, the notification/instruction unit 70 determines that the notification of a sequence number is necessary, and when an Indicator is not added, the notification/instruction unit 70 determines that the notification of a sequence number is not necessary.

Thus, even when receiving the notification of a re-establishment, the reception device does not necessarily notify a sequence number in an upper layer.

Further, the transmission device transmits to the reception device an Indicator or the like in which "ON" and "OFF" can be set, thus controlling the necessity of the notification of a sequence number in an upper layer for data that the reception device desires to receive.

For example, when transmitting or receiving data being insusceptible to a small amount of data loss, the notification/instruction unit 70 sets the Indicator to "OFF" or does not add the Indicator, so as not to request a sequence number. On the other hand, when transmitting or receiving data being susceptible to a data loss, the notification/instruction unit 70 sets the Indicator to "ON" or adds the Indicator, so as to request a sequence number.

Alternatively, when the QoS (service quality) is low, the notification/instruction unit 70 sets the Indicator to "OFF" or does not add the Indicator, so as not to request an sequence number. On the other hand, when the QoS is high, the notification/instruction unit 70 sets the Indicator to "ON" or adds the Indicator, so as to request a sequence number.

According to the above description, when performing a re-establishment, the reception device can notify a sequence number as needed.

Further, when performing a re-establishment, the transmission device can request a sequence number as needed.

As a result, an amount of control data and a control load can be reduced, so that a more flexible control can be made possible.

Next, processes of the data processor units 12 and 22, when performing a re-establishment, are described with reference to a specific example shown in FIG. 4.

Figure 4:
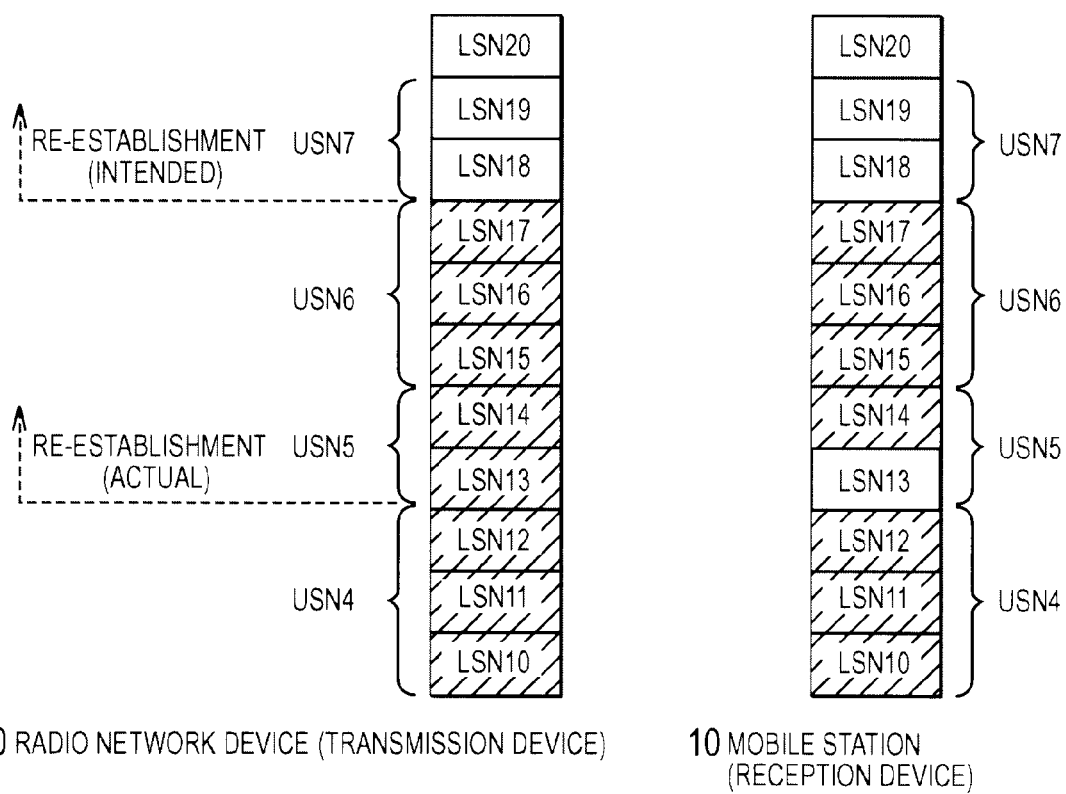
FIG. 4 is a diagram illustrating a process at a time of re-establishment according to the embodiment of the present invention.

In FIG. 4, a description is given for the case where the mobile station 10 is a reception device and the radio network device 20 is a transmission device. In addition, a description is also given for the case where, in response to the notification of a re-establishment, the mobile station 10 notifies about a sequence number in an upper layer.

In FIG. 4, sequence numbers in the RLC layer being a lower layer are designated as "Lower Sequence Numbers (LSNs)", and sequence numbers in the RRC layer and the PDCP layer being upper layers are designated as "Upper Sequence Numbers (USNs)".

Data (RLC-PDU) in the RLC layer and data in an upper layer are associated with (mapped to) each other. As a result, the LSNs and the USNs are associated with each other.

To be more precise, mappings are established between the following respective relationships: data of the LSNs 10 to 12 and data of the USN 4; data of the LSNs 13 to 14 and data of the USN 5; data of the LSNs 15 to 17 and data of the USN 6; and data of the LSNs 18 to 19 and data of the USN 7.

For example, since an amount of data to be transmitted is increased, the determination unit 82 of the radio network device 20 which is a transmission device determines that the size of a data unit in the RLC layer, i.e. the RLC-PDU (Protocol Data Unit), needs to be changed and, therefore, that re-establishment is necessary.

In response to a determination result, the determination unit 82 transmits data units (RLC-PDU) of the LSNs 1 to 17 having a size of 320 bits, and requests the RLC processor unit 40 to re-establish, in a size of 640 bits, data units (RLC-PDU) of the LSNs subsequent to the LSN 17.

In response to a request from the upper layer processor unit 80, the RLC processor unit 40 of the radio network device 20 transmits data units (RLC-PDU) of the LSNs 1 to 17 in a size of 320 bits, and intends to transmit data units (RLC-PDU) of the LSNs subsequent to the LSN 17 in a size of 640 bits.

In this case, first, the RLC processor unit 40 of the radio network device 20 transmits data (RLC-PDU) of the LSNs 1 to 17 in a size of 320 bits. Further, the notification/instruction unit 70 of the radio network device 20 notifies the mobile station 10 of the re-establishment of data in the RLC layer.

The RLC processor unit 40 of the mobile station 10, which is a reception device, transmits a positive acknowledgement to the radio network device 20 for data (RLC-PDU) which has been normally and completely received, while transmitting a negative acknowledgement thereto for data which has not been normally received and which has resulted in a reception error.

For example, when data (RLC-PDU) of the LSN 13 has not been normally received and has resulted in a reception error, the mobile station 10 transmits a positive acknowledgement to the radio network device 20 for the LSNs 1 to 12 and 14 to 17, and also transmits a negative acknowledgement thereto for the LSN 13.

Further, the acquiring unit 60 of the mobile station 10 acquires the notification of data in the RLC layer from the radio network device 20, and inputs the acquired notification in the notification/instruction unit 70 of the mobile station 10.

In response to the notification of the re-establishment, the notification/instruction unit 70 notifies the radio network device 20 of a sequence number in an upper layer for data which is desired to be received next.

At this time, the notification/instruction unit 70 acquires a received result from the RLC processor unit 40. On the basis of the received result, the notification/instruction unit 70 determines that, since data (RLC-PDU) of the LSN 13 which has resulted in a reception error is contained, data of the USN 5 results in an error when assembling data in the RRC layer, the PDCP layer and the like being upper layers.

The notification/instruction unit 70 notifies the radio network device 20 of the sequence number, i.e. the USN 5, in the upper layer containing the data (RLC-PDU) of the LSN 13 which has resulted in a reception error, as a sequence number of data which is desired to be received.

In the same manner, for example, even when the data (RLC-PDU) of the LSN 13 has been normally received but data (RLC-PDU) of a LSN 14 has resulted in a reception error, the notification/instruction unit 70 can notify the radio network device 20 of the sequence number USN 5.

Further, when there are a plurality of reception errors, the notification/instruction unit 70 can notify the radio network device 20 of the smallest sequence number among sequence numbers for data in the upper layer which contain data (RLC-PDU) in the lower layer having resulted in reception errors.

For example, when data of the LSN 13 and data of the LSN 16 concurrently result in reception errors, the notification/instruction unit 70 can notify the radio network device 20 of the smallest sequence number in the upper layer, which is the USN 5.

In this manner, the notification/instruction unit 70 can notify the radio network device 20 of a sequence number of data in the upper layer associated with data in the lower layer (RLC-PDU) which is desired to be received.

The acquiring unit 60 of the radio network device 20 acquires the sequence number, the USN 5, in the upper layer of data that the mobile station 10 desires to receive, and inputs the acquired sequence number in the RLC processor unit 40.

The RLC processor unit 40 performs a re-establishment from the data having the USN 5 notified from the mobile station 10.

In other words, the RLC processor unit 40 of the radio network device 20 has initially intended to perform a re-establishment, in a size of 640 bits, on data units (RLC-PDUs) of the LSNs subsequent to the LSN 17 and then transmit the same, but the RLC processor unit 40 thereof performs a re-establishment in such a way that the size of data units (RLC-PDUs) of the LSNs subsequent to a LSN 12 associated with the USN 5 is changed to 640 bits, and then transmits the data to the mobile station 10.

In this way, the RLC processor unit 40 can start performing a re-establishment from data (RLC-PDU) in the lower layer associated with a notified sequence number in the upper layer.

Further, when changing the size of a data unit (RLC-PDU) in the RLC layer being a lower layer, the RLC processor unit 40 can perform a re-establishment from data having a sequence number in an upper layer.

The RLC processor unit 40 of the mobile station 10 performs a reception process on data which is re-established from data of a notified sequence number.

In other words, the RLC processor unit 40 of the mobile station 10 has initially intended to perform a reception process on data units (RLC-PDU) having the LSNs subsequent to the LSN 17, which data units are handled as those re-established in a size of 640 bits, but the RLC processor unit 40 thereof performs a reception process on data units (RLC-PDU) having the LSNs subsequent to the LSN 12 associated with the USN 5, which data units are handled as those re-established in a size of 640 bits.

(Communication Method)

Figure 5:
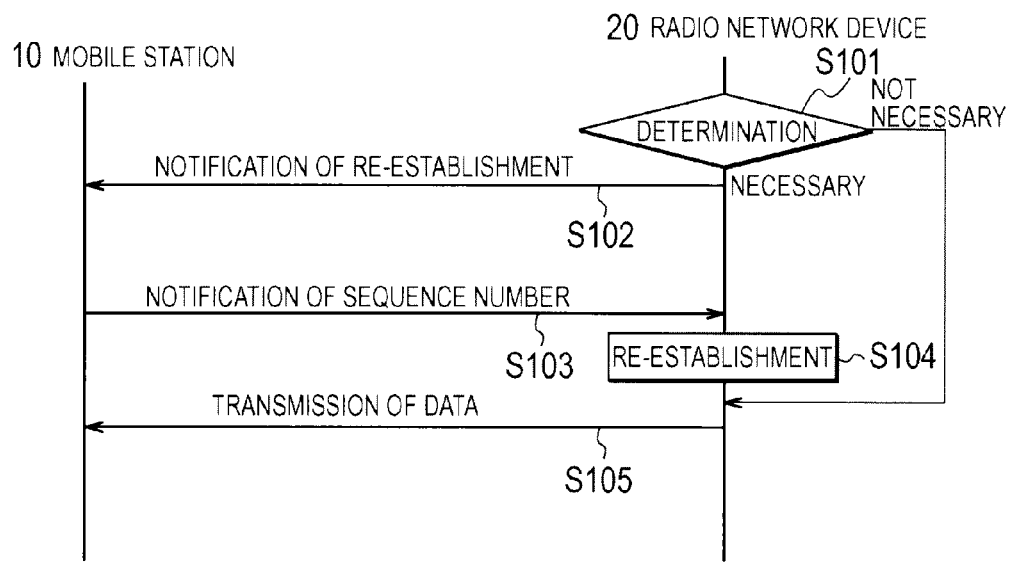
FIG. 5 is a diagram of a sequence showing a procedure of a communication method according to the embodiment of the present invention.
Figure 6:
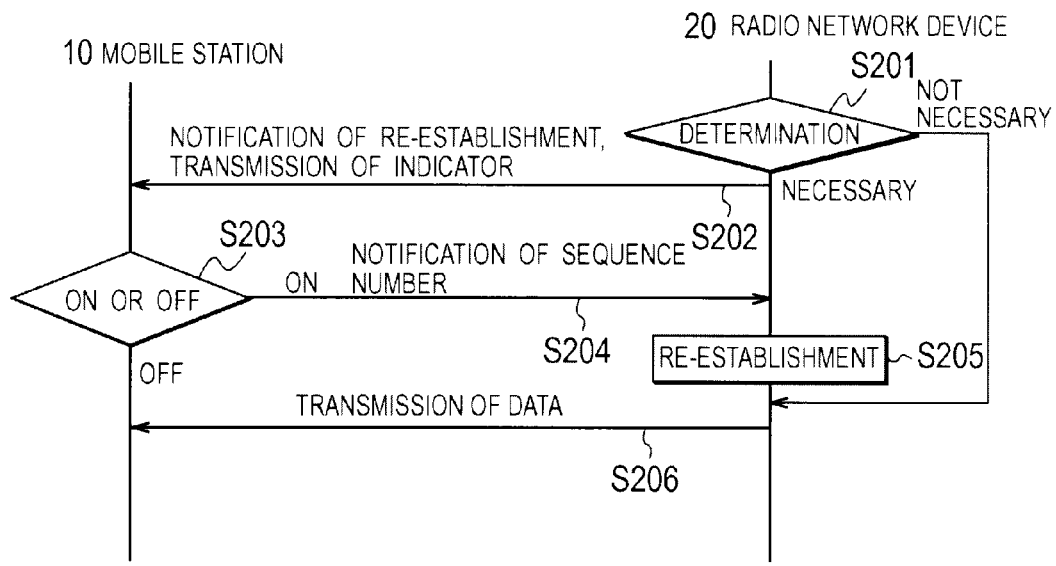
FIG. 6 is a sequence diagram showing a procedure of a communication method when using instruction data according to the embodiment of the present invention.

Next, a communication method in the communication system 100 is described with reference to FIGS. 5 and 6. In FIGS. 5 and 6, a description is given for the case where the mobile station 10 is a reception device and the radio network device 20 is a transmission device.

First, referring to FIG. 5, a procedure in which a sequence number in an upper layer is notified in response to notification of a re-establishment is described.

The radio network device 20 determines whether or not a re-establishment of data in an upper layer is necessary (S101).

When determining that a re-establishment of data in an upper layer is necessary, the radio network device 20 notifies the mobile station 10 of a re-establishment of data in an upper layer (S102).

In response to the notification of the re-establishment from the radio network device 20, the mobile station 10 notifies the radio network device 20 of a sequence number in an upper layer of data which is desired to be received (S103).

The radio network device 20 starts performing a re-establishment from data (RLC-PDU) having the sequence number notified from the mobile station 10 (S104).

The radio network device 20 transmits data thus re-established to the mobile station 10 (S105).

On the other hand, when determining in S101 that a re-establishment of data is not necessary, the radio network device 20 transmits data without performing a re-establishment (S105).

Next, referring to FIG. 6, a procedure in which a sequence number in an upper layer is notified by the mobile station 10 in response to the instruction data (Indicator).

The radio network device 20 determines whether or not a re-establishment of data in the RLC layer is necessary (S201).

When determining that the re-establishment is necessary, the radio network device 20 determines whether or not the notification of a sequence number in the upper layer is necessary, and adds the Indicator (instruction data) to the notification of the re-establishment.

Further, the radio network device 20 transmits the notification of the re-establishment and the Indicator to the mobile station 10, and notifies the mobile station 10 of the re-establishment of data in the RLC layer and, concurrently, instructs, to the mobile station 10, whether or not the notification of a sequence number is necessary (S202).

The mobile station 10 determines whether or not the Indicator is "ON" or "OFF", the indicator having been added to the notification of the re-establishment from the radio network device 20 (S203).

When the Indicator is "ON", the mobile station 10 notifies the radio network device 20 of a sequence number (USN) in the upper layer of data which is desired to be received (S204).

The radio network device 20 performs a re-establishment from data (RLC-PDU) having the sequence number in the upper layer notified from the mobile station 10 (S205).

The radio network device 20 transmits re-established data to the mobile station 10 (S206).

On the other hand, when determining in S201 that the re-establishment is not necessary, the radio network device 20 transmits data to the mobile station 10 without performing a re-establishment (S206).

Further, when the Indicator is "OFF" in S203, a sequence number (USN) is not notified.

Thus, the radio network device 20 performs a re-establishment from data having an initially intended sequence number (USN), and then transmits the data to the mobile station 10 (S206).

(Effects)

According to the mobile station 10, the radio network device 20, the communication system 100 and the communication method described above, when the mobile station 10 or the radio network device 20 works as a reception device, it is possible to recognize that a re-establishment is performed on data in a lower layer.

Thus, the mobile station 10 or the radio network device 20 can notify a transmission device of re-established data which is desired to be received, using a sequence number in an upper layer than a layer in which a re-establishment is to be performed.

Further, the mobile station 10 or the radio network device 20 can perform a reception process on the data which is re-established from data having the sequence number notified to the transmission device.

As a result, the mobile station 10 or the radio network device 20 can receive desired data, so that the re-establishment of data makes it possible to prevent a data loss.

Further, according to the mobile station 10, the radio network device 20, the communication system 100 and the communication method described above, when working as a transmission device, the mobile station 10 or the radio network device 20 can notify a reception device that data are to be re-established in the lower layer.

Still further, the mobile station 10 or the radio network device 20 can recognize re-established data that the reception device desires to receive, by using a sequence number in an upper layer than a layer in which a re-establishment is to be performed.

Further, the mobile station 10 or the radio network device 20 can start re-establishing data in a lower layer, from data having a sequence number that the reception device desires to receive, and transmit the data.

Consequently, the mobile station 10 or the radio network device 20 is capable of preventing a data loss by re-establishing data.

In other words, according to the mobile station 10, the radio network device 20, the communication system 100 and the communication method, it is possible to perform communication with no data loss, and to achieve a lossless data transmission, by transmitting and receiving the data which is desired to be received, using a sequence number in the upper layer.

Moreover, according to the mobile station 10, the radio network device 20, the communication system 100 and the communication method, the notification/instruction unit 70 of the reception device notifies a sequence number in the upper layer based on a received result of data. Accordingly, even when data is re-established, the reception device requests the transmission of data which have not been normally transmitted and received, and thus can receive the data. As a result, the occurrence of a data loss can be more securely prevented.

Further, according to the mobile station 10, the radio network device 20, the communication system 100 and the communication method, the acquiring unit 60 of the reception device acquires instruction data for requesting a sequence number from a transmission device, and the notification/instruction unit 70 of the reception device notifies the sequence number in response to the instruction data. In this way, the reception device can notify a sequence number as needed when re-establishment is performed. Thus, an amount of control data and a control load can be reduced, so that a more flexible control can be made possible.

Still further, according to the mobile station 10, the radio network device 20, the communication system 100 and the communication method, when changing the size of a data unit in the RLC layer (a lower layer), the RLC processor unit 40 (lower layer processor unit) of the transmission device can re-establish data from data having a sequence number in the RRC layer, the PDCP layer or the like (an upper layer). Accordingly, when changing the size of a data unit requires a data re-establishment, the transmission device can re-establish data from data having a sequence number of an upper layer notified from the reception device.

Yet further, according to the mobile station 10, the radio network device 20, the communication system 100 and the communication method, when the determination unit 82 determines that a re-establishment is necessary, the RLC processor unit (a lower processor unit) 40 of the transmission device can perform a re-establishment from data having a sequence number. Hence, the transmission device can make a re-establishment when needed, and a control load can be reduced, so that a more flexible control can be made possible.

In addition, according to the mobile station 10, the radio network device 20, the communication system 100 and the communication method, since the transmission device includes an instruction unit configured to request the reception device for a sequence number, the transmission device transmits instruction data to the reception device and, thus, can request the reception device for a sequence number. Hence, an amount of control data and a control load can be reduced, so that a more flexible control can be made possible.

Incidentally, it is to be understood that the present invention is not limited to the above-described embodiment, and various changes may be made therein. The communication system is not limited to a mobile communication system to which the W-CDMA is applied, and may be a mobile communication system using another radio access system or may be a radio communication system.

Moreover, in the above-described embodiment, although the mobile station 10 and the radio network device 20 each operate as a reception device and a transmission device, they may each include only one function of the reception device and the transmission device.

Further, the communication system may include a base station and a radio controller device instead of the radio network device 20. In this case, a mobile station and the radio controller device can make transmission and reception therebetween through the base station.

INDUSTRIAL APPLICABILITY

As described above, according to the present invention, it is possible to prevent a data loss from occurring due to re-establishment of data.

The invention claimed is:

1. A reception device comprising:
an acquiring unit configured to acquire, from a transmission device, a notification of re-establishment of data in a lower layer;
a notifying unit configured to notify, to the transmission device, a sequence number in a higher layer of data which is desired to be received; and
a lower layer processing unit configured to perform a reception process of data which is re-established from the data having the sequence number, wherein
the acquiring unit is configured to acquire, from the transmission device, instruction data for requesting the sequence number, and
the notifying unit is configured to notify the sequence number, in accordance with the instruction data.

2. The reception device according to claim 1, wherein the notifying unit is configured to notify the sequence number in the higher layer, based on the reception result of the data.

3. A transmission device comprising:
a notifying unit configured to notify, to a reception device, re-establishment of data in a lower layer;
an acquiring unit configured to acquire, from the reception device, a sequence number in a higher layer of data which is desired to be received;
an instructing unit configured to request the reception device to notify the sequence number, by transmitting instruction data; and
a lower layer processing unit configured to perform the re-establishment from the data having the sequence number.

4. The transmission device according to claim 3, wherein the lower layer processing unit is configured to perform the re-establishment from the data having the sequence number, when changing a size of data unit in the lower layer.

5. The transmission device according to claim 3, further comprising:
a judging unit configured to judge necessity of the re-establishment; wherein
the lower layer processing unit is configured to perform the re-establishment from the data having the sequence number, when the judging unit judges that the re-establishment is necessary.

6. A communication system comprising:
a reception device configured
to acquire, from a transmission device, a notification of re-establishment of data in a lower layer;
to notify, to the transmission device, a sequence number in a higher layer of data which is desired to be received;
to perform a reception process of data which is re-established from the data having the sequence number;
to acquire, from the transmission device, instruction data for requesting the sequence number, and
to notify the sequence number, in accordance with the instruction data; and a transmission device configured
to notify, to the reception device, the re-establishment;
to acquire, from the reception device, a sequence number in a higher layer of data which is desired to be received; and
to perform the re-establishment from the data having the sequence number.

7. A communication method comprising:
notifying, from a transmission device to a reception device, re-establishment of data in a lower layer;
notifying, from the reception device to the transmission device, a sequence number in a higher layer of data which is desired to be received;
performing, at the transmission device, the re-establishment from the data having the sequence number; and
performing, at the reception device, a reception process of data which is re-established from the data having the sequence number, wherein
the sequence number is requested by the transmission device from the reception device by transmitting instruction data.

* * * * *